United States Patent
Mahieu et al.

(10) Patent No.: US 10,653,063 B2
(45) Date of Patent: May 19, 2020

(54) MONITORING SYSTEM FOR AN AGRICULTURAL HARVESTER AND AGRICULTURAL HARVESTER

(71) Applicant: CNH Industrial America LLC, New Holland, PA (US)

(72) Inventors: Thomas Mahieu, Ypres (BE); Bart M. A. Missotten, Herent (BE); Bart Lenaerts, Zutendaal (BE); Frederik Tallir, Esen (BE); Jeroen Lowie, Oostkamp (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/577,611

(22) Filed: Sep. 20, 2019

(65) Prior Publication Data

US 2020/0008352 A1    Jan. 9, 2020

Related U.S. Application Data

(62) Division of application No. 15/360,284, filed on Nov. 23, 2016, now Pat. No. 10,470,365.

(51) Int. Cl.
*A01D 41/12* (2006.01)
*A01D 41/06* (2006.01)
*A01D 41/127* (2006.01)

(52) U.S. Cl.
CPC ......... *A01D 41/1243* (2013.01); *A01D 41/06* (2013.01); *A01D 41/1271* (2013.01)

(58) Field of Classification Search
CPC ............................ A01D 41/1243; A01D 41/06
See application file for complete search history.

(56) References Cited

U.S. PATENT DOCUMENTS

| | | | |
|---|---|---|---|
| 9,699,967 B2 * | 7/2017 | Palla | A01D 41/1243 |
| 2006/0183519 A1 * | 8/2006 | Benes | A01D 41/1243 460/111 |

(Continued)

FOREIGN PATENT DOCUMENTS

| | | |
|---|---|---|
| DE | 10346541 A1 | 7/2005 |
| DE | 102015202643 A1 | 9/2015 |

(Continued)

OTHER PUBLICATIONS

EP16200701.7, Extended European Search Report, dated Mar. 27, 2017, 4 pages.

(Continued)

*Primary Examiner* — Manuel A Rivera Vargas
*Assistant Examiner* — Yaritza H Perez Bermudez
(74) *Attorney, Agent, or Firm* — Peter Zacharias; Patrick Sheldrake

(57) ABSTRACT

A combine harvester including an aft portion, a spreader assembly, a monitoring system, and a processing unit. The monitoring system including sensors coupled to the aft portion. The sensors: receiving a plurality of response waves reflected from a portion of the crop residue that is discharged from the spreader assembly toward a discharge area before the portion of crop residue arrives at the discharge area; and sending a response signal representative of the plurality of response waves reflected from the portion of the crop residue, the reflected waves comprising a sequence of multiple reflections distributed over time. The processing unit receiving the response signal from the plurality of sensors; and processing the response signal to determine a reflected energy distribution from the portion of the crop residue representative of a distribution of the crop residue over the discharge area substantially perpendicular to a travel direction of the combine harvester.

24 Claims, 7 Drawing Sheets

(56) References Cited

U.S. PATENT DOCUMENTS

| | | | | |
|---|---|---|---|---|
| 2007/0026915 A1* | 2/2007 | Anderson | .......... | A01D 41/1243 |
| | | | | 460/112 |
| 2011/0270495 A1* | 11/2011 | Knapp | ................ | A01B 79/005 |
| | | | | 701/50 |
| 2013/0095899 A1 | 4/2013 | Knapp | | |
| 2015/0264864 A1* | 9/2015 | Branch | .............. | A01D 41/1243 |
| | | | | 701/50 |

FOREIGN PATENT DOCUMENTS

| | | | | |
|---|---|---|---|---|
| DE | 10214014049 A1 | 3/2016 | | |
| EP | 0685151 A1 | 12/1995 | | |
| EP | 0685151 A1 * | 12/1995 | ......... | A01D 41/1243 |
| EP | 0887660 A2 | 12/1998 | | |
| EP | 1271139 A2 | 1/2003 | | |
| EP | 1356729 A1 | 10/2003 | | |
| EP | 1570726 A1 | 9/2005 | | |
| EP | 1570726 A1 * | 9/2005 | ............. | A01F 12/40 |
| EP | 2020168 A1 * | 2/2009 | ........... | A01B 69/008 |
| EP | 2020168 A1 | 2/2009 | | |
| EP | 2143316 A1 | 1/2010 | | |
| EP | 2517549 A1 | 10/2012 | | |
| EP | 2586286 A1 | 5/2013 | | |
| EP | 2591654 A1 | 5/2013 | | |
| WO | 2015177190 A1 | 11/2015 | | |
| WO | WO-2015177190 A1 * | 11/2015 | ............. | G01S 15/88 |

OTHER PUBLICATIONS

EP16200701.7, European Office Action, dated Apr. 10, 2017, 8 pages.
BE201505761, Belgium Search Report and Written Opinion, dated Aug. 1, 2016, 11 pages.

* cited by examiner

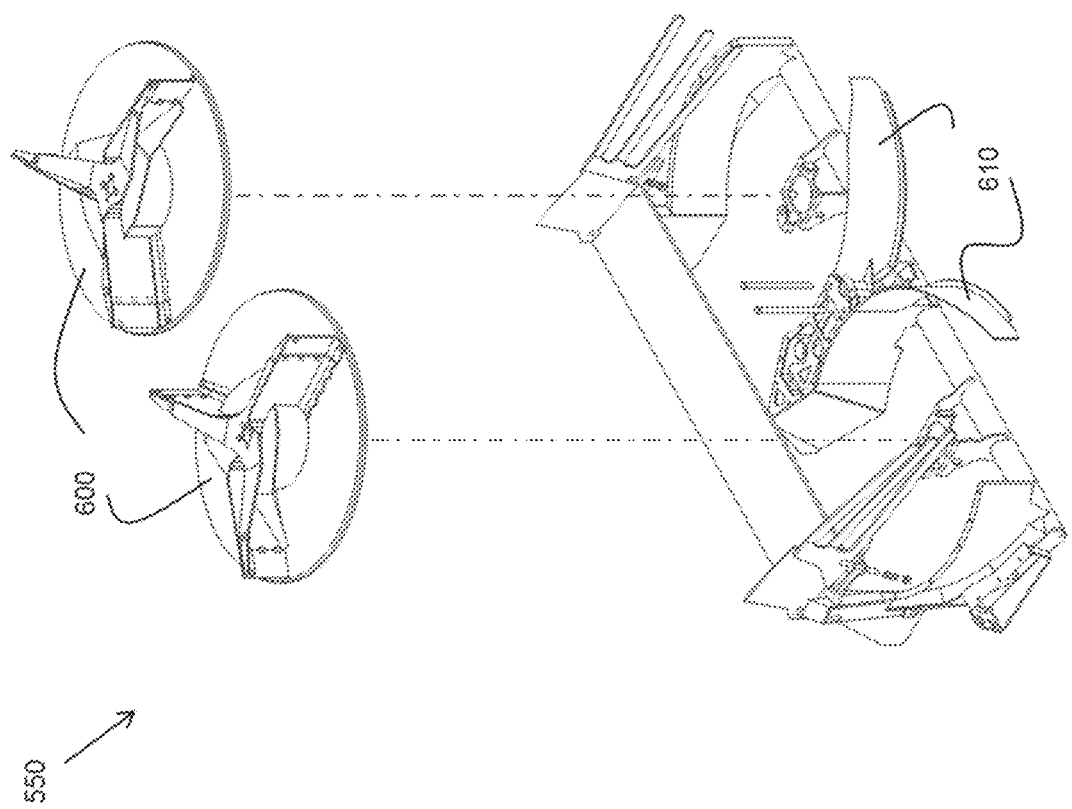

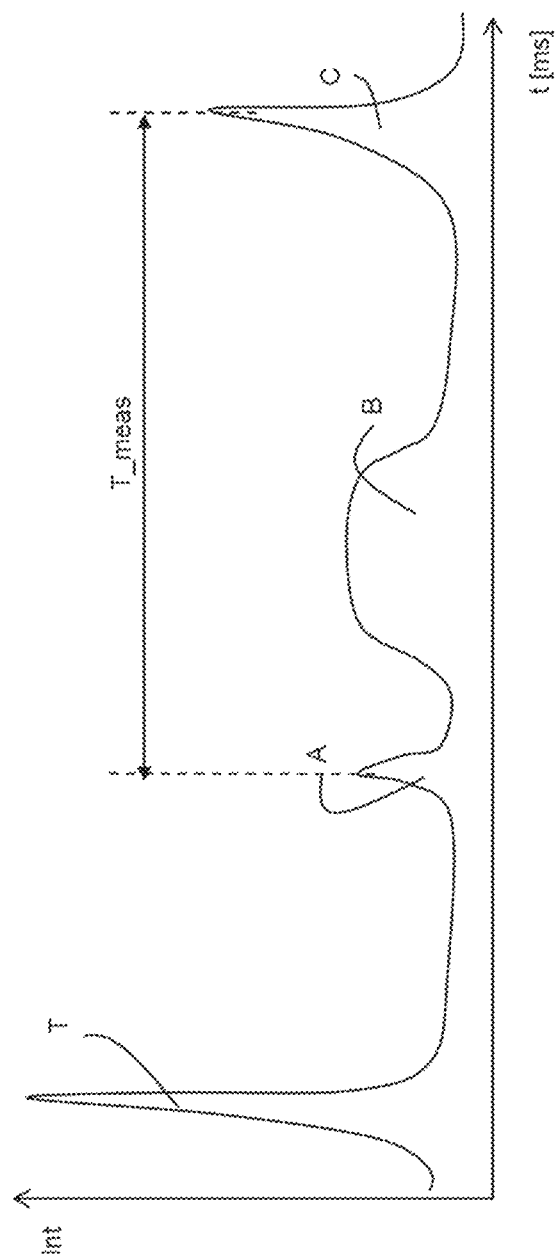

MONITORING SYSTEM FOR AN AGRICULTURAL HARVESTER AND AGRICULTURAL HARVESTER

CROSS REFERENCE TO RELATED APPLICATION

This is a division of U.S. patent application Ser. No. 15/360,284, entitled "MONITORING SYSTEM FOR AN AGRICULTURAL HARVESTER AND AGRICULTURAL HARVESTER", filed Nov. 23, 2016, which is incorporated herein by reference. Application Ser. No. 15/360,284 claims priority to Belgium Application No. 2015/5761 filed Nov. 24, 2015.

FIELD OF THE INVENTION

The invention relates to the field of agricultural harvesters such as combines which including a threshing assembly for separating the various components of a harvested crop, e.g. grain and straw.

In particular, the invention relates to a monitoring system for assessing the quality of the distribution of chopped straw onto a field.

BACKGROUND OF THE INVENTION

An agricultural harvester, also referred to as a combine or combine harvester because it typically combines multiple harvesting functions, typically includes a header for removing a crop from a field and a so-called threshing tool for performing a threshing operation on the crop in order to separate the grain from the non-grain material such as straw and chaff. The non-grain material may also be referred to as the residue. This residue, i.e. the chaff and straw is typically left on the field. In general, the chaff is spread in the field over the width of the combine. With respect to the straw, typically two options exist.

In a first operating mode, referred to as "swath mode", the straw is outputted onto the field in a so-called swath, ready for a baler to pick it up.

In a second operating mode, referred to as "chopping mode", the straw is chopped and outputted on the field where it serves as fertilizer for the soil. The straw is therefore chopped fine to obtain an optimal rotting process such that it can be absorbed into the soil thereby setting free minerals for subsequent crops.

In order to obtain an effective fertilization of the soil it is important that the chopped straw, in general the crop residue, is sufficiently small and that the chopped straw is evenly, or uniformly distributed over the field. As such, the crop residue should be distributed over a width substantially corresponding to a width of the header of the harvester that cuts the crop. In order to distribute or spread the crop residue, e.g. chopped straw, agricultural harvesters are typically equipped with a spreader tool that is mounted at the back of the harvester. The spreading tool is configured to receive a flow of chopped straw and deflect it to both the right hand sight and the left hand sight of the harvester. It is known that the way the residue or chopped crop is affected by different parameters, e.g. including the elevation of the field, the wind direction and magnitude, the density of the chopped straw, etc.

In order to improve the distribution of the residue or chopped straw, monitoring systems have been suggested. Examples of such monitoring systems include the use of a camera to picture the swath of chopped straw leaving the harvester, or the use of wind vanes and/or wind velocity sensors. In another example, the use of a pair of ultrasonic sensors is suggested, the pair of ultrasonic sensors that are directed to the respective streams of chopped straw towards the left hand side and the right hand side of the harvester.

None of these arrangements however enables to assess the distribution of the chopped straw over the entire width of the header of the harvester. Therefore, there is a need for an improved monitoring system for assessing the distribution of chopped straw as outputted onto a field.

SUMMARY OF THE INVENTION

It would be desirable to provide an agricultural harvester which enables an assessment of the distribution of chopped straw or crop residue over the entire width of a harvester's header in a more accurate manner. Therefore, the present invention provides, in an embodiment, in a monitoring system for a combine harvester having a header with a header width for harvesting a crop, the monitoring system comprising:

a plurality of sensors configured to:

1. provide a plurality of measurement waves to a discharge area for crop residue, the discharge area having a width substantially corresponding to the header width;

2. receive a plurality of response waves reflected from the discharge area;

a processing unit comprising an input terminal configured to receive a response signal of the plurality of sensors, the response signal representative of the plurality of response waves reflected from the discharge area; the processing unit being configured to process the response signal and determine, based on the response signal, a distribution of a crop residue over the discharge area; the processing unit further comprising an output terminal configured to output a distribution signal representative of the distribution of the crop residue over the discharge area.

The processing unit is also configured to determine, based on the response signal, a reflected energy distribution over the discharge area and apply the reflected energy distribution to determine the distribution of the crop residue over the discharge area, the reflected waves comprising a sequence of multiple reflections distributed over time, the processing unit further being configured to determine a volume of the distribution of the crop residue over the discharge area. Additionally, the processing unit is configured to determine, based on the sequence of multiple reflections, a distribution of the crop residue in a direction substantially perpendicular to a longitudinal axis defining the header width In accordance with the present invention, the plurality of sensors are configured to provide a plurality of measurement waves to an area of interest, i.e. an area onto which a crop residue is to be distributed or discharged. This area is further on also referred to as the discharge area for the crop residue. The measurement waves as provided by the sensors may e.g. be acoustic pulses, ultrasonic pulses or electromagnetic pulses or waves. In an embodiment, a sensor of the plurality of sensors may e.g. include a transmitter configured to transmit the measurement wave, e.g. an acoustic or ultrasonic wave, to the discharge area and a receiver configured to receive a response wave, i.e. a reflected wave, from the discharge area.

In an embodiment, the sensors as applied in the monitoring system according to the present invention may include a radar to emit radar waves as the measurement waves and a plurality of antennas to receive the reflected waves.

Examples of such radars may include CW-radars (Continuous Waves) or FMCW-radars (Frequency Modulated Continuous Waves).

The monitoring system according to the present invention, which may e.g. be mounted to a combine harvester for monitoring crop residue such as chopped straw, is configured to monitor a distribution of the crop residue over a distribution area, whereby the area substantially spanning a width of a header of the harvester.

Typically, a combine harvester comprises a chopping assembly for chopping a residue of the harvested crop, e.g. straw, to an appropriate size to be spread of the field and a spreading assembly or spreader, to provide in an appropriate distribution of the crop residue that was chopped over the field. Typically, such a spreading assembly may be configured to separate a flow of crop residue as received from the chopping assembly into a first flow that is outputted to a left hand side of the harvester and a second flow that is outputted on a right hand side of the harvester. It is however insufficient to merely monitor the amount of crop residue in both flows thus ensuring that substantially the same amount of crop residue is spread on both sides; in order to realize an effective fertilization of the field, the distribution of the crop residue should be as uniform as possible over the entire field. In order to realize this, the distribution of the crop residue, as outputted by a spreader, should be monitored over an area of interest that spans the width of the header of the harvester.

In order to realize this, the monitoring system according to the present invention comprises a plurality of sensors configured to:

1. Provide a plurality of measurement waves to the discharge area for the crop residue and
2. Receive a plurality of response waves reflected from the discharge area.

In an embodiment of the present invention, a plurality of sensors, such as ultrasonic sensors, is used to monitor the discharge area for the crop residue, the area having a width substantially corresponding to the width of the harvester's header that cuts the crop. In accordance with the present invention, the sensors are configured to provide, i.e. emit, a plurality of measurement waves to the discharge area, thereby substantially covering the entire discharge area.

In an embodiment, the plurality of sensors comprises an array of sensors that are arranged along a substantially straight line, parallel to the header and substantially spanning the header width. In such an arrangement, each of the sensors may monitor a sub area of the discharge area by emitting a measurement wave, e.g. an ultrasonic pulse, to the respective sub area.

In another embodiment, one or more of the plurality of sensors are configured to rotate or swivel during operation. Alternatively, or in addition, a revolving deflector may be applied in the path of the measurement wave or waves of the sensors, thereby obtaining a fan-shaped scan of the discharge area or a part thereof. In such an arrangement, a single sensor may cover or monitor multiple sub areas of the area of interest, i.e. the discharge area, by emitting, while rotating or swiveling, multiple measurement waves. In such an embodiment, the monitoring system may still cover or monitor the entire discharge area with a limited number of sensors.

In accordance with the present invention, the plurality of sensors is further configured to receive a plurality of response waves reflected from the discharge area.

In order to realize this, the sensors may, in an embodiment, each comprise a transmitter configured to transmit the measurement wave to the area of interest, or a subarea thereof, and a receiver configured to receive the response wave from the discharge area.

Alternatively, the number of transmitters need not be the same as the number of receivers. In an embodiment, the plurality of sensors applied comprise more receivers or receiving units than transmitter or transmitting units. In such arrangement, the angle at which a reflection has occurs, may be assessed more accurately. In particular in case of the use of radar waves as the measurement waves, it may be advantageous to apply one or more emitters emitting, as a measurement wave, a modulated wave and an array of antennas, as receivers. By observing the phase difference between the signals as received, an angle of the incoming reflected wave can be determined.

The monitoring system according to the present invention further comprises a processing unit. Such a processing unit may e.g. comprise a microprocessor or the like for performing mathematical operations on signals that are received.

In accordance with the present invention, the processing unit of the monitoring system comprises an input terminal configured to receive a response signal of the plurality of sensors, the response signal representative of the plurality of response waves reflected from the area of interest. The input terminal may be a single input terminal or a multichannel input terminal. In the latter case, each sensor may be connected to a different channel of the input terminal. The response signal as received at the input terminal may e.g. be an analogue voltage signal, e.g. a voltage signal outputted by the sensor in response to the receipt of a response wave.

In accordance with the present invention, the processing unit is configured to process the response signal and determine, based on the response signal, a distribution of a crop residue over the discharge area, the area of interest substantially spanning the header width. As will be explained in more detail below, by analyzing the response waves, or signals representing the reflected waves, a processing unit may determine whether or not there is crop residue present (i.e. spread) on a particular location of the area of interest, i.e. the discharge area. As such, due to the fact that the discharge area that is covered by the measurement waves substantially spans the entire width of the header, the crop residue distribution along the width of the header may be determined or estimated.

Based on the reflected waves, the processing unit may further, in an embodiment, assess the uniformity of the distribution of the crop residue along the header width.

In an embodiment, the monitoring system is mounted to a combine harvester according to the present invention. In general, such a harvester comprises a header for harvesting a crop of a field, a threshing and chopping system for separating a crop residue from the harvested crop, a spreader assembly for spreading the crop residue onto the field and a monitoring system according to the invention. As an example, the harvester may be configured to harvest grain whereby the threshing and chopping system is configured to separate the grain and chop the remaining straw, the chopped straw thus being considered the crop residue. The use of the monitoring system according to the present invention on such a combine harvester enables to monitor the distribution of the crop residue, as distributed by the spreader assembly, along the width of the header of the harvester.

These and other aspects of the invention will be more readily appreciated as the same becomes better understood by reference to the following detailed description and considered in connection with the accompanying drawings in which like reference symbols designate like parts.

BRIEF DESCRIPTION OF THE DRAWINGS

FIG. 5 schematically depicts various components of the spreader assembly as shown in FIG. 4.

FIGS. 6a and 6b schematically illustrate the measurement principle as applied in a monitoring system according to the present invention.

DETAILED DESCRIPTION OF EMBODIMENTS

Figure 1:
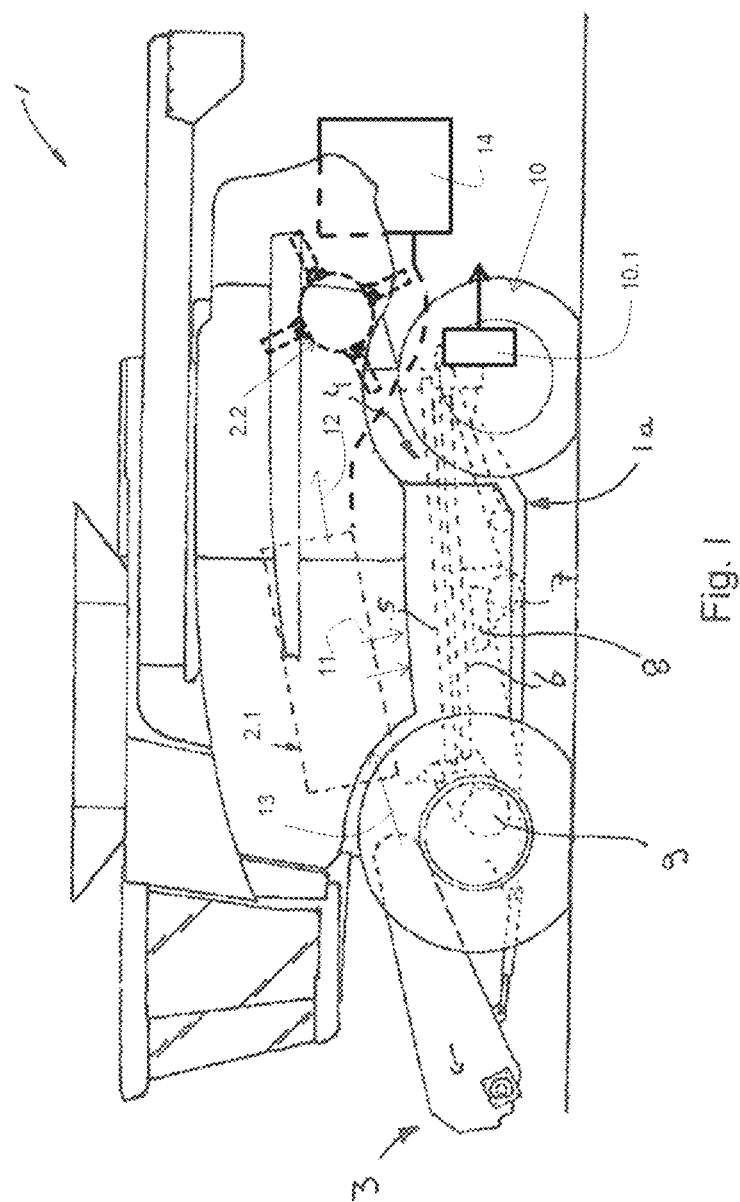
FIG. 1 depicts a monitoring system mounted to a combine harvester according to an embodiment of the present invention.

FIG. 1 depicts, in a cross-sectional view, a combine harvester 1 including a monitoring system 10 according to an embodiment of the present invention. The agricultural harvester 1 can e.g. be configured to harvest grain as a crop, whereby chopped straw can be considered a crop residue. The harvester 1 as schematically shown in FIG. 1 comprises a header 3 for harvesting a crop, a threshing and chopping system 2 for separating the harvested crop (the flow of harvested crop being indicated by the arrow 13) into crop that is e.g. gathered in an onboard tank (not shown) and crop residue, e.g. chopped straw. In the embodiment as shown, the threshing and chopping system comprises a threshing assembly 2.1 configured to separate the cut crop into a first stream or flow (indicated by the arrow 11), substantially composed of grain and chaff, and a second stream or flow (indicated by the arrow 12), substantially composed of straw. The second stream or flow 12 is subsequently processed by a chopping assembly 2.2 of the threshing and chopping system 2, thereby generating a flow of crop residue, e.g. chopped straw, that is distributed onto the field by a spreader assembly 14. In the harvester according to the present invention, this crop residue is monitored by a monitoring system 10 which is configured to provide a distribution signal representative of the distribution of the crop residue over a discharge area substantially spanning the width of the header 3 of the harvester 1. The width of the header 3 being understood as the length of the header 3 in a direction perpendicular to the cross-sectional view of FIG. 1. In order to realize this, the monitoring system 10 comprises a plurality of sensors, e.g. ultrasonic sensors 10.1, configured to provide a plurality of measurement waves to the discharge area, the discharge area being the area onto which a spreader assembly 14 of the combine harvester 1 spreads or should spread the crop residue. Note that the sensors as applied in the monitoring system 10 may be mounted at different locations on the harvester 1. The sensors 10.1 may e.g. be mounted on top of the spreader assembly 14, on both sides of the rear portion of the harvester 1, or even on the header 3. In case the crop residue (e.g. chopped straw) is spread onto the field, the purpose is to realize a fertilization of the field. The chopped crop is spread over the field where it decomposes such that it can be absorbed into the soil thereby setting free minerals for subsequent crops.

In order to obtain an optimal fertilization, a uniform distribution of the crop residue over the field is preferred. In order to assess the manner in which the crop residue is spread over the area of interest, the plurality of sensors 10.1 is further configured to receive a plurality of response waves reflected from the discharge area, in response to the plurality of measurement waves that were provided to the discharge area. These response waves, or a signal representative thereof are provided to an input terminal of a processing unit of the monitoring system 10 and processed, as will be explained in more detail below.

Further, as schematically shown in FIG. 1, the first stream 11 of harvested crop may e.g. be conveyed via a grain pan to a cleaning mechanism 4, e.g. including one or more sieves 5, 6, driven by a drive assembly 8. The fine material, e.g. grain, that is collected below the sieves is transported by means of an auger 7, e.g. to an elevator.

Figure 2:
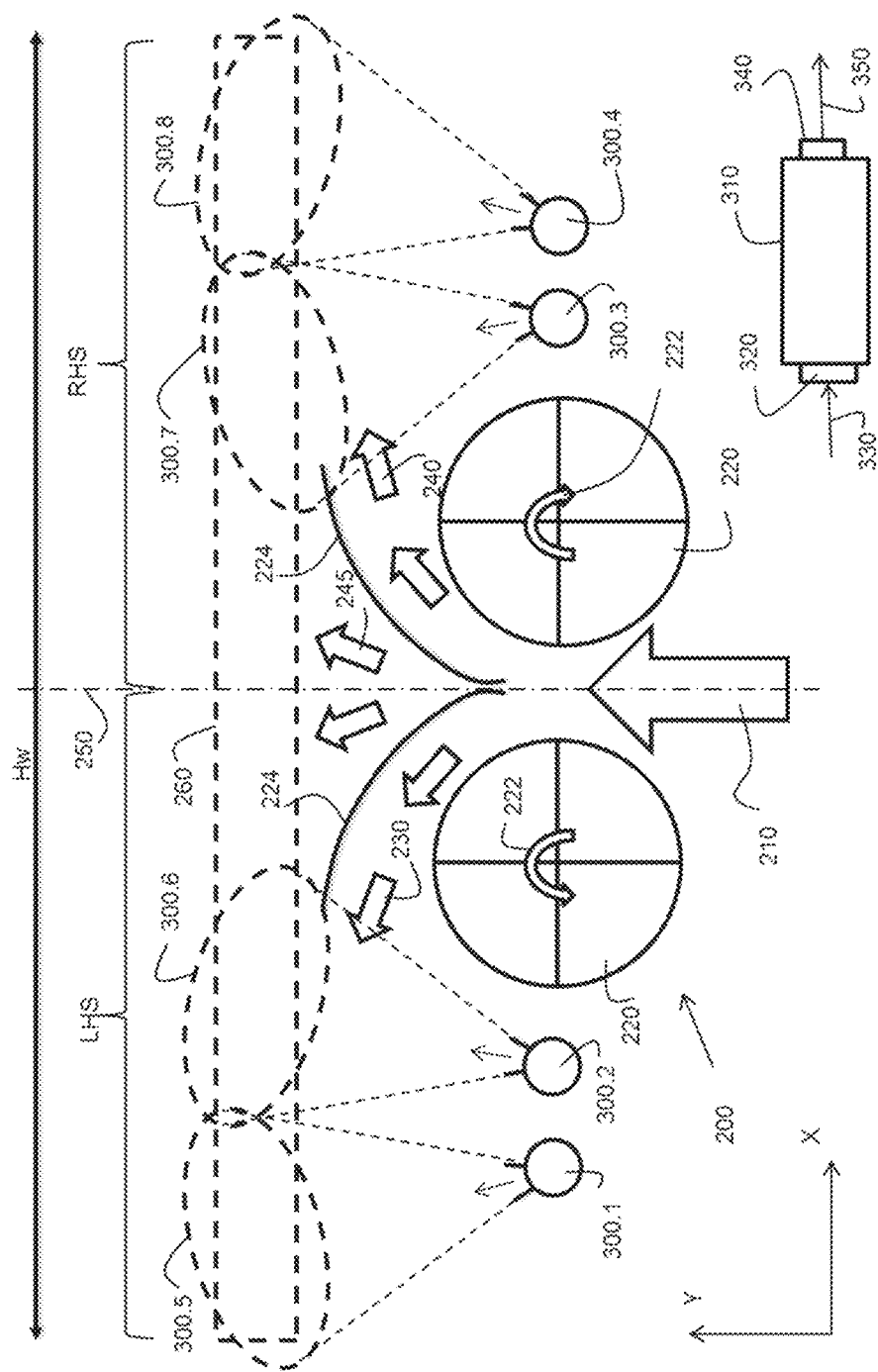
FIG. 2 schematically depicts a top view of a spreader assembly as can be applied in a combine harvester according to the present invention and a first embodiment of a monitoring system according to the present invention.

FIG. 2 schematically shows a top view of a spreader assembly as can be applied in a combine harvester according to the present invention and an embodiment of a monitoring system according to the present invention. FIG. 2 schematically depicts a spreader assembly 200 (comparable to the spreader assembly 14 of FIG. 1) configured to receive a flow of crop residue 210, e.g. from a chopping assembly such as chopping assembly 2.2 as shown in FIG. 1, and spread the flow of crop residue. In the embodiment as shown, the spreader assembly 200 comprises two rotational elements 220, rotating in the indicated directions 222, to guide the flow 210, and two deflectors 224 configured to receive the flow of crop residue 210, deflect at least part of it and distribute the flow onto the left hand side LHS, resp. right hand side RHS as indicated by the arrows 230, resp. 240. The left hand side LHS area and right hand side RHS area are here defined relative to a longitudinal axis 250 of the harvester to which the spreader assembly 200 is mounted. By adjusting the position of the deflectors 220, the distribution of the crop residue on the resp. LHS and RHS can be adjusted. Note that by appropriate shaping and positioning of the deflectors 224, part of the flow of crop residue, indicated by the arrows 245, can be spread on the field behind the spreader assembly 200.

The objective of the spreading of the crop residue flow 210 is to arrive at a substantially uniform distribution over an area of interest 260, i.e. the area onto which the crop residue is to be spread or discharged. This discharge area having an width substantially spanning the width Hw of the header of the harvester (not shown) to which the spreading assembly 200 is mounted.

In order to assess the distribution of the crop residue over the area of interest 260, the present invention provides in a monitoring system. FIG. 2 schematically includes an embodiment of such a monitoring system, the monitoring system comprises a plurality of sensors 300.1-300.4, e.g. ultrasonic sensors that are configured to:

provide a plurality of measurement waves to the area of interest and;

receive a plurality of response waves reflected from the area of interest.

Typically, sensors that are configured to emit a measurement wave are configured to emit such wave in a particular direction or range. In the embodiment as shown, the sensors 300.1-300.4 are each configured, i.e. oriented, to emit a measurement wave such that it covers a particular sub area of the area of interest 260. In FIG. 2, the sub areas onto which the measurement waves emitted by the sensors 300.1-300.4 are projected, are schematically indicated by reference numbers 300.5-300.8. In an embodiment, the plurality of sensors can be configured such that the sub areas 300.5-300.8 combined substantially cover the area of interest 260. Depending on the width of the discharge area, the width corresponding to the header width Hw, this may require one or more sensors on each side (LHS or RHS) of the harvester.

The plurality of sensors 300.1-300.4 are further configured to receive a plurality of response waves that are reflected from the area of interest. In particular, the sensors may be configured to receive response waves that are reflected from the sub areas, e.g. sub areas 300.5-300.8 to which they have emitted the measurement waves. In such arrangement, each sensor may e.g. comprise a transmitter for transmitting a measurement wave such as an ultrasonic pulse to the area of interest, or a sub area thereof, and a receiver for receiving a response wave. In such embodiment, the transmitter and receiver may be arranged adjacent to each or may be somewhat separated from each other. Note however that the functionality of transmitting and receiving may also be combined. In such arrangement, the sensors may comprise a transceiver that can be operated in transmissive mode to emit a measurement wave and in receiving mode to receive a response wave. It can further be noted that embodiments having a different number of transmitters and receivers, may be considered as well.

In an embodiment, one or more radars are applied to emit the plurality of measurement waves to the discharge area. As an example, a CW (Continuous Wave) radar may be applied to emit measurement waves to the discharge area. Such a CW-radar enable to determine both the velocity and the direction of movement of the flow of crop residue that is discharged. Such a CW-radar provides in a comparatively high sensitivity, is robust and suitable to be applied in dusty environments such as occurring at the rear of a combine harvester. Typically, a measurement wave as emitted by a radar sensor may span 60 degrees or more. As an alternative to the use of a CW-radar, the use of an FMCW (Frequency Modulated Continuous Waves) radar may be worth mentioning. In addition to the assessment of the velocity and direction of the flow of crop residue, such an FMCW-radar also enables to determine a location of the flow of residue.

In an embodiment, a combination of a radar based monitoring system and an ultrasonic based monitoring system may be considered as well. In such a system, a CW-radar may e.g. be applied to primarily determine the velocity and direction of a flow of crop residue, whereas the ultrasonic sensor or sensors are applied to determine a position of the flow of crop residue.

In accordance with the present invention, the monitoring system further comprises a processing unit. The monitoring system as shown in FIG. 2 comprises a processing unit 310 having an input terminal 320 to receive a response signal 330 representative of the plurality of response waves reflected from the area of interest. Such a processing unit 310 can be embodied as a processor, a microprocessor, a computer or the like and in general comprises a memory unit for storing data such as the response signal and a computational unit for processing the data received. The response signal 330 can e.g. be provided to the processing unit 310 by means of a wired connection between the sensors 300.1-300.4 and the processing unit 310 or by means of a wireless connection.

In an embodiment, the processing unit 310 may also be configured to control the plurality of sensors 300.1-300.4, in particular, the processing unit 310 may be configured to control at least one of a timing of the measurement pulses or waves, an amplitude of the measurement pulses or waves or a frequency or frequency content of the measurement pulses or waves.

In accordance with the present invention, the processing unit 310 is configured to process the response signal 330 and determine, based on the response signal, a distribution of the crop residue over the area of interest 260. This processing will be explained in more detail below.

In accordance with the present invention, the processing unit 310 further comprising an output terminal 340 configured to output a distribution signal 350 representative of the distribution of the crop residue over the area of interest. Such a distribution signal may e.g. in the form of a graph or table specifying the distribution as a function of the position along the header width Hw.

In an embodiment, the distribution signal is provided to a display unit that is mounted in a cabine of the harvester, in order to provide a visual feedback of the distribution of the crop residue to the operator of the harvester. Based on this feedback, the operator may then adjust, if needed, an operating parameter of the harvester, in particular of the spreader assembly of the harvester, to adjust the spreading of the crop residue, thereby adjusting the distribution of the crop residue over the discharge area 260.

Figure 3:
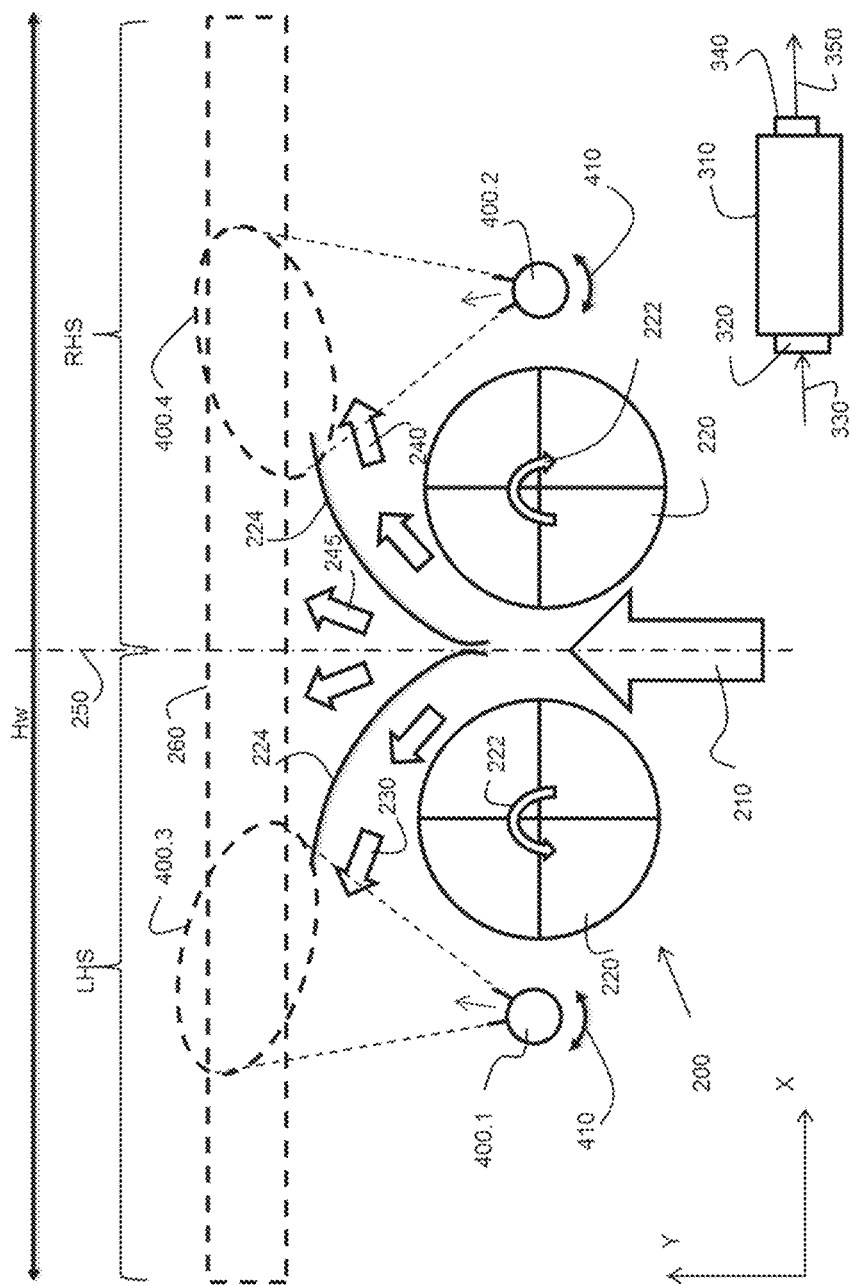
FIG. 3 schematically depicts a top view of a spreader assembly as can be applied in a combine harvester according to the present invention and a second embodiment of a monitoring system according to the present invention.

In the embodiment shown in FIG. 2, a plurality of sensors 300.1-300.4 are applied to monitor the discharge area, each sensor monitoring a fixed sub area of the discharge area. Depending on the width Hw of the discharge area to be covered, this may require a comparatively large amount of sensors. In FIG. 3, an alternative embodiment is shown, whereby the sensors as used are configured to swivel during operation. As a result, a larger part of the discharge area can be covered by a sensor, thus reducing the number of sensors required to substantially cover the entire discharge area.

FIG. 3 schematically shows a top view of a spreader assembly as can be applied in a combine harvester according to the present invention and an embodiment of a monitoring system according to the present invention. The spreader assembly 200 as shown is the same as the assembly shown in FIG. 2 and is configured to spread of crop residue 210 in a similar manner as described above. The embodiment of the monitoring system as shown comprises two sensors 400.1, 400.2 that are configured to respectively monitor the left hand side LHS and the right hand side RHS of the discharge area 260. As schematically shown in FIG. 3, the sensors 400.1 and 400.2 can cover, in the position as shown, sub areas 400.3 and 400.4 of the discharge area 260 respectively. In the embodiment as shown, the sensors 400.1 and 400.2 are rotatable, as indicated by the arrows 410. In the embodiment as shown, the sensors may rotate about an axis perpendicular to the XY-plane, i.e. about a vertical axis. By doing so, the measurement waves as emitted by the sensors may be sequentially directed to different sub areas of the discharge area, thus covering a larger portion of the discharge area. In an embodiment, the rotation or swivel movement of the sensors may be a substantially continuous movement during which the sensor emits a sequence of measurement waves and receives a plurality of response waves. Alternatively, the sensors may conduct a stepwise movement to cover different sub areas of the discharge area.

In an embodiment, the first sensor 400.1 is configured to substantially cover, by means of the swivel movement, the left hand side area (LHS) of the discharge area 260, whereas the second sensor 400.2 is configured to substantially cover, by means of the swivel movement, the right hand side area (RHS) of the discharge area 260.

The processing of the response waves as received by the sensors 400.1 and 400.2 may be provided, in a similar manner as described above, to a processing unit 310.

Note that, depending on the mounting position of the sensors relative to the discharge area, the required rotational movement of the sensors to cover the discharge area may be determined. In case the sensors are e.g. mounted above the discharge area, a rotation about the Y-axis may e.g. be performed to cover a desired part of the discharge area by a sensor.

As an alternative to, or in addition to, a rotational movement to cover a desired part of the discharge area by a sensor, the sensor may also be configured to be translated. In order to realise this, the sensor may e.g. be configured to translate along a rail, e.g. a rail extending in the X-direction.

In order to rotate or translate the sensors as applied in an embodiment of the monitoring system according to the present invention, one or more actuators may be applied. Such actuators may e.g. include electromagnetic, hydraulic or pneumatic actuators.

Figure 4:
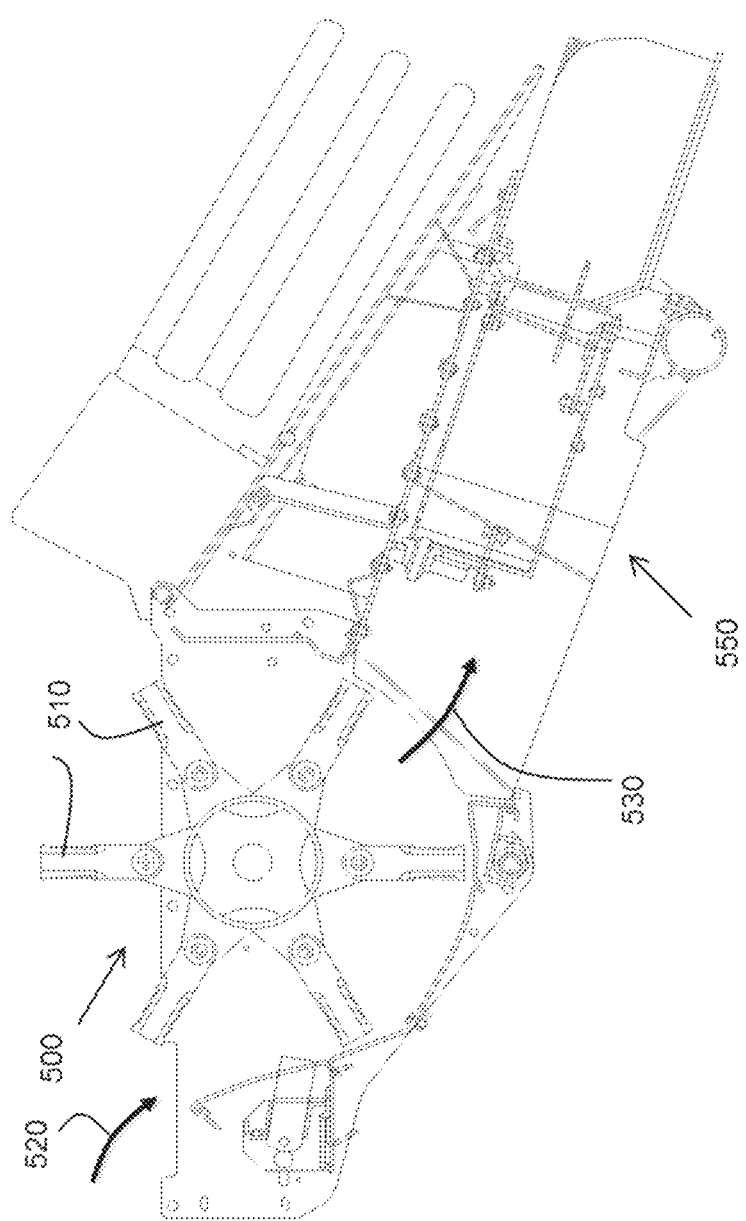
FIG. 4 schematically depicts a cross-sectional view of part of a threshing and chopping system and a spreader assembly as can be applied in a combine harvester according to the present invention.

FIGS. 4 and 5 show a more detailed view on a spreader assembly as can be applied in a combine harvester according to the present invention.

FIG. 4 schematically depicts a cross-sectional view of part of a threshing and chopping system and a spreader assembly as can be applied in a combine harvester according to the present invention. FIG. 4 schematically depicts a chopping tool 500 comprising a plurality of blades 510, the chopping tool 500 being configured to receive a flow of straw 520, chop the straw to obtain crop residue and provide the flow of crop residue, indicated by the arrow 530, to a spreader assembly 550, the spreader assembly 550 being configured to spread the crop residue onto the field, as described above.

FIG. 5 schematically shows various components of the spreader assembly 550 as indicated in FIG. 4. The spreader assembly 550 as shown comprises a pair of rotatable elements 600 (comparable to the rotatable elements 220 as shown in FIGS. 2 and 3) that are configured to receive a flow of crop residue, and a pair of deflectors 610 (comparable to the deflectors 224 as shown in FIGS. 2 and 3) for distributing the flow of crop residue over a discharge area, in particular a discharge area spanning a width of a header of the combine harvester to which the spreader assembly is mounted.

In order to control the actual distribution of the crop residue, a position of the deflectors 610 may be adjustable. In an embodiment, the deflectors may be configured to rotate about a vertical axis, thereby adjusting the distribution of the crop residue on either the left hand side or the right hand side of the spreader assembly.

In an embodiment, the deflector 610 may be configured to displace along a vertical axis to adjust the distribution of the crop residue.

In an embodiment, a rotational speed of the rotatable elements 600 can be made adjustable. In such embodiment, the rotatable elements 600 may e.g. be configured to rotate at the same variable speed, or each rotatable element may be controlled individually.

By means of the aforementioned ways to adjust the operation of the spreader assembly 550, the distribution of the crop residue can be controlled, in order to take account of different or varying harvesting conditions. The distribution of the crop residue, in particular the uniformity over the header width thereof, may be adversely affected by the harvesting conditions, e.g. the conditions of the field that is harvested, or the weather conditions.

In case the field that is harvested is tilted, this will affect how the crop residue is spread. Similarly, in case of wind or rain, the distribution of the crop residue may be affected.

By means of the monitoring system according to the present invention, in particular by means of the processing of a signal representative of a plurality of response waves by the processing unit of the monitoring system, a distribution signal is made available, the distribution signal being representative of the distribution of the crop residue over the discharge area. The distribution signal may subsequently be used to control an operational parameter of the combine harvester, in particular of the spreader assembly of the combine harvester.

As an example, in case the distribution signal indicates that the distribution of the crop residue is not as desired along the discharge area, a position of one or both of the deflectors 610 of the spreader assembly 550 as shown in FIG. 5 can be adjusted, in order to adjust the distribution of the crop residue.

In an embodiment, the control of the spreader assembly is performed by an operator of the harvester. In such embodiment, the distribution signal as provided by the processing unit of the monitoring system may e.g. be provided to a display unit of the combine.

In an embodiment, the control of the spreader assembly can be automated. In such embodiment, the processing unit may be configured to determine, based on the distribution of the crop residue as determined, an appropriate control signal for controlling an operation of the spreader assembly.

Figure 6A:
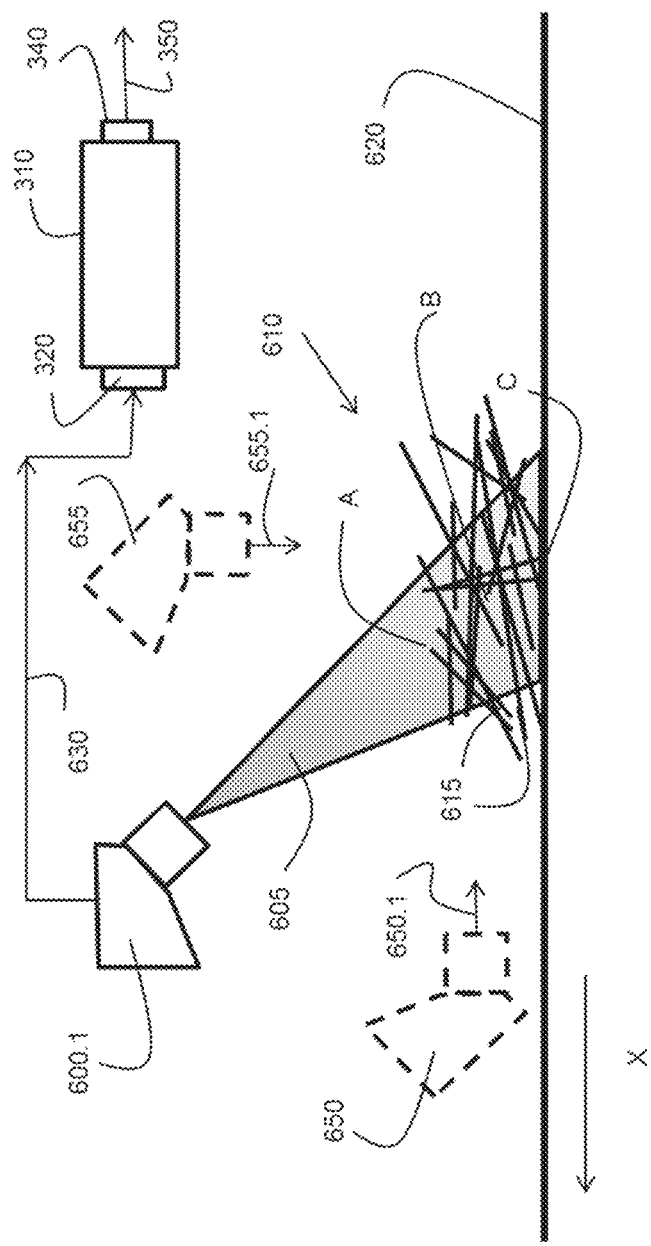

In FIGS. 6*a* and 6*b*, the measurement principle as applied in the monitoring system according to the present invention is schematically shown. FIG. 6*a* schematically shows a cross-sectional view along the driving direction X of a sensor 600.1 as can be applied in a monitoring system according to the invention, the sensor 600.1 being configured to provide a measurement wave 605 to a discharge area 610 on a field 620 onto which a flow of crop residue 615 is discharged. In an embodiment, the sensor 600.1 is configured to transmit an ultrasonic pulse towards the discharge area or a subarea thereof and receive one or reflected pulses of the crop residue 615 that is discharged on the discharge area 610.

FIG. 6*b* schematically depicts an intensity level Int of a transmitted pulse T and a subsequent response comprising reflected pulses A, B, and C. In FIG. 6*a*, the locations A, B, and C are used to indicate the positions from which the respective reflected pulses originate.

In an embodiment, the functionality of a transmitter and a receiver as applied in a sensor such as an ultrasonic sensor 600.1 may be combined in a so-called transceiver which may both be configured to transmit a pulse and to pick-up or receive any reflected pulses in response to the transmitted pulse.

Depending on the size and structure of the discharged crop residue 615, e.g. chopped straw, multiple reflected pulses may be observed, e.g. by a receiver of the sensor 600.1. Since reflected pulse A is the first pulse to be received by the receiver, one can assume the location from which reflected pulse A originates to be the closest to the receiver of the sensor 600.1. As such, reflected pulse A can be assumed to originate from the top surface of the layer of crop residue, as indicated in FIG. 6*a*. Note that, as explained below, the origin of the reflected pulses may depend on the position and orientation of the sensors as applied. In case the sensors are positioned at a comparatively low position, e.g.

close to the field as schematically indicated by position of sensor 650, and configured to emit measurement waves in a horizontal plane, additional reflections may occur due to stalks that are present on the field. As can be seen in the intensity level graph of FIG. 6b, reflected pulse C is the last pulse to be received by the receiver. As such, it can be assumed that this pulse represents a reflection on the field 620. In accordance with the present invention, the sensor 600.1 is configured to output a signal 630 representative of the response wave, e.g. the received reflected pulses and provide this signal to a processing unit 310, e.g. a processing unit 310 as shown in FIGS. 2 and 3.

As explained with reference to FIGS. 2 and 3, such a processing unit 310 as applied in a monitoring system according to the present invention is configured to receive a response signal of the plurality of sensors, e.g. at an input terminal 320 of the processing unit 310, the response signal representative of the plurality of response waves reflected from the discharge area; the processing unit being configured to process the response signal and determine, based on the response signal, a distribution of the crop residue over the discharge area; the processing unit 310 further comprises an output terminal 340, configured to output a distribution signal 350 representative of the distribution of the crop residue 615 over the discharge area 610.

Based on the reflected pulses as e.g. received by the sensor 600.1, in particular the timing of the pulses (e.g. pulses A, B and C as shown in FIG. 6b and the period T_meas between the receipt of the first pulse A and the last pulse C), the processing unit 310 may determine certain characteristics of the discharged crop residue, e.g. a layer thickness or a density of the discharged crop residue 615. As such, in an embodiment, the uniformity of the distribution of the crop residue over the discharge area may be determined and applied as input to control an operation of the spreading assembly of the combine harvester to which the monitoring system is mounted.

In FIG. 6a, two alternative positions 650, 655 of a sensor of the monitoring system are shown. As can be seen, the sensors of the monitoring system according to the present invention may be oriented to emit a measurement wave 650.1, 655.1 in various directions, ranging from a substantially horizontal direction in position 650 to a vertical position in position 655. As will be understood, the received reflected measurement waves and their processing by the processing unit may vary depending on the applied orientation. In an embodiment, a combination of sensors having different orientations relative to the discharge area may be applied. In an embodiment, the sensors as applied in the monitoring system according to the present invention are configured to monitor the flow of crop residue before the crop residue touches the field, i.e. the flow of crop residue is monitored during the flight. In such embodiment, the processing unit may be configured to determine, based on the reflected signals as received, the position on the discharge area where the crop residue will land on the field. In an embodiment, the plurality of sensors is configured to provide in reflected measurement waves originating from different positions of the flow of crop residue as emitted by the spreader assembly. In such an arrangement, the processing unit may be configured to determine, for the different positions, the density and velocity of the flow of crop residue, by processing the reflected measurement pulses or waves. By doing so, an assessment of the distribution of the crop residue over the discharge area can be made.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or control unit may fulfil the functions of several items recited in the claims.

The invention claimed is:

1. A combine harvester comprising:
   an aft portion;
   a threshing and chopping system for separating a crop residue from the harvested crop;
   a spreader assembly for discharging onto the field the crop residue received from the threshing and chopping system; and
   a monitoring system comprising:
      a plurality of sensors coupled to the aft portion of the combine harvester, the plurality of sensors:
         receiving a plurality of response waves reflected from a portion of the crop residue that is discharged from the spreader assembly toward a discharge area before the portion of crop residue arrives at the discharge area, the discharge area being aft of the aft portion; and
         sending a response signal representative of the plurality of response waves reflected from the portion of the crop residue, the reflected waves comprising a sequence of multiple reflections distributed over time; and
      a processing unit in communication with the plurality of sensors, the processing unit executing steps of:
         receiving the response signal from the plurality of sensors; and
         processing the response signal to determine a reflected energy distribution from the portion of the crop residue representative of a distribution of the crop residue over the discharge area in a direction substantially perpendicular to a travel direction of the combine harvester.

2. The combine harvester of claim 1, wherein the processing unit further executes a step of adjusting an element of the spreader assembly to thereby change the distribution of the crop residue in the discharge area dependent upon the reflected energy distribution.

3. The combine harvester of claim 1, wherein the sensors provide a plurality of measurement waves toward the portion of the crop residue that is discharged from the spreader assembly, at least a portion of the measurement waves being reflected from the portion of the crop residue as the response waves.

4. The combine harvester of claim 1, wherein the plurality of sensors are arranged along a substantially straight line along the aft portion.

5. The combine harvester of claim 1, wherein the plurality of sensors are directed toward subareas of the discharge area.

6. The combine harvester of claim 1, wherein the plurality of sensors comprise a first sensor to monitor a left-hand side of the discharge area and a second sensor to monitor a right-hand side of the discharge area.

7. The combine harvester of claim 6, wherein the first and second sensors rotate during operation, to cover the respective left-hand side and the right-hand side of the discharge area.

8. The combine harvester of claim 1, wherein the processing unit further executes a step of determining, based on the response signal, a density of a flow of the crop residue at a location in the discharge area.

9. The combine harvester of claim 1, wherein the processing unit further executes steps of:
determining, based on the response signal, a total reflected energy of one or more of the response waves; and
determining, based on the total reflected energy, the distribution of the crop residue over the discharge area.

10. The combine harvester of claim 1, wherein the processing unit further executes a step of assessing a uniformity of the distribution of the crop residue over the discharge area.

11. The combine harvester of claim 3, wherein the plurality of sensors are radar sensors, each including:
a transmitter configured to transmit a respective one of the plurality of measurement waves toward the crop residue that is discharged from the spreader assembly; and
a receiver configured to receive a respective one of the plurality of response waves from the portion of the crop residue.

12. A combine harvester comprising:
an aft portion;
a threshing and chopping system for separating a crop residue from the harvested crop;
a spreader assembly for discharging onto the field the crop residue received from the threshing and chopping system; and
a monitoring system having a plurality of sensors coupled to the aft portion of the combine harvester, the monitoring system configured to execute steps of:
receiving a plurality of response waves reflected from a portion of the crop residue that is discharged from the spreader assembly toward a discharge area before the portion of crop residue arrives at the discharge area, the discharge area being aft of the aft portion;
sending a response signal representative of the plurality of response waves reflected from the portion of the crop residue, the reflected waves comprising a sequence of multiple reflections distributed over time;
receiving the response signal from the plurality of sensors; and
processing the response signal to determine a reflected energy distribution from the portion of the crop residue representative of the distribution of the crop residue over the discharge area in a direction substantially perpendicular to a travel direction of the combine.

13. The combine harvester of claim 12, wherein the monitoring system further executes a step of adjusting an element of the spreader assembly to thereby change the distribution of the crop residue in the discharge area dependent upon the reflected energy distribution.

14. The combine harvester of claim 12, wherein the plurality of sensors provide a plurality of measurement waves toward the portion of the crop residue that is discharged from the spreader assembly, at least a portion of the measurement waves being reflected from the portion of the crop residue as the response waves.

15. The combine harvester of claim 12, wherein the plurality of sensors are arranged along a substantially straight line along the aft portion.

16. The combine harvester of claim 12, wherein the plurality of sensors comprise a first sensor to monitor a left-hand side of the discharge area and a second sensor to monitor a right-hand side of the discharge area.

17. The combine harvester of claim 16, wherein the first and second sensors rotate during operation, to cover the respective left-hand side and the right-hand side of the discharge area.

18. The combine harvester of claim 14, wherein the plurality of sensors are radar sensors, each including:
a transmitter configured to transmit a respective one of the plurality of measurement waves toward the crop residue that is discharged from the spreader assembly; and
a receiver configured to receive a respective one of the plurality of response waves from the portion of the crop residue.

19. The monitoring system of claim 18, wherein the radar sensors are a CW or a FMCW radar.

20. A combine harvester comprising:
an aft portion;
a header for harvesting a crop of a field, the header having a header width;
a threshing and chopping system for separating a crop residue from the harvested crop received from the header;
a spreader assembly for discharging onto the field the crop residue received from the threshing and chopping system; and
a monitoring system comprising:
a plurality of sensors coupled to the aft portion, the plurality of sensors:
providing a plurality of measurement waves toward the crop residue discharged by the spreader assembly toward a discharge area for the crop residue, the discharge area being an area of ground aft of the spreader having a width approximately the same as the header width;
receiving a plurality of response waves reflected from a portion of the crop residue that is discharged toward the discharge area before the portion of crop residue arrives at the discharge area; and
sending a response signal representative of the plurality of response waves reflected from the portion of the crop residue; and
a processing unit executing steps of:
receiving the response signal;
processing the response signal to determine a distribution of the crop residue over the discharge area; and
altering the distribution of the crop residue by adjusting an element of the spreader assembly dependent upon the response signal.

21. The combine harvester of claim 20, wherein the element of the spreader assembly is a deflector that alters the distribution of the crop residue by a movement of the deflector.

22. The combine harvester of claim 20, wherein the processing the response signal step includes determining, based on the response signal, a density of a flow of the crop residue at a location in the discharge area.

23. The combine harvester of claim 1, wherein the processing the response signal step includes determining a reflected energy distribution from the portion of the crop residue representative of the distribution of the crop residue over the discharge area before the crop residue touches the field.

24. The combine harvester of claim 12, wherein the processing the response signal step includes determining the reflected energy distribution from the portion of the crop residue representative of the distribution of the crop residue over the discharge area where the crop residue will land on the field.

* * * * *